Patented Mar. 30, 1926.

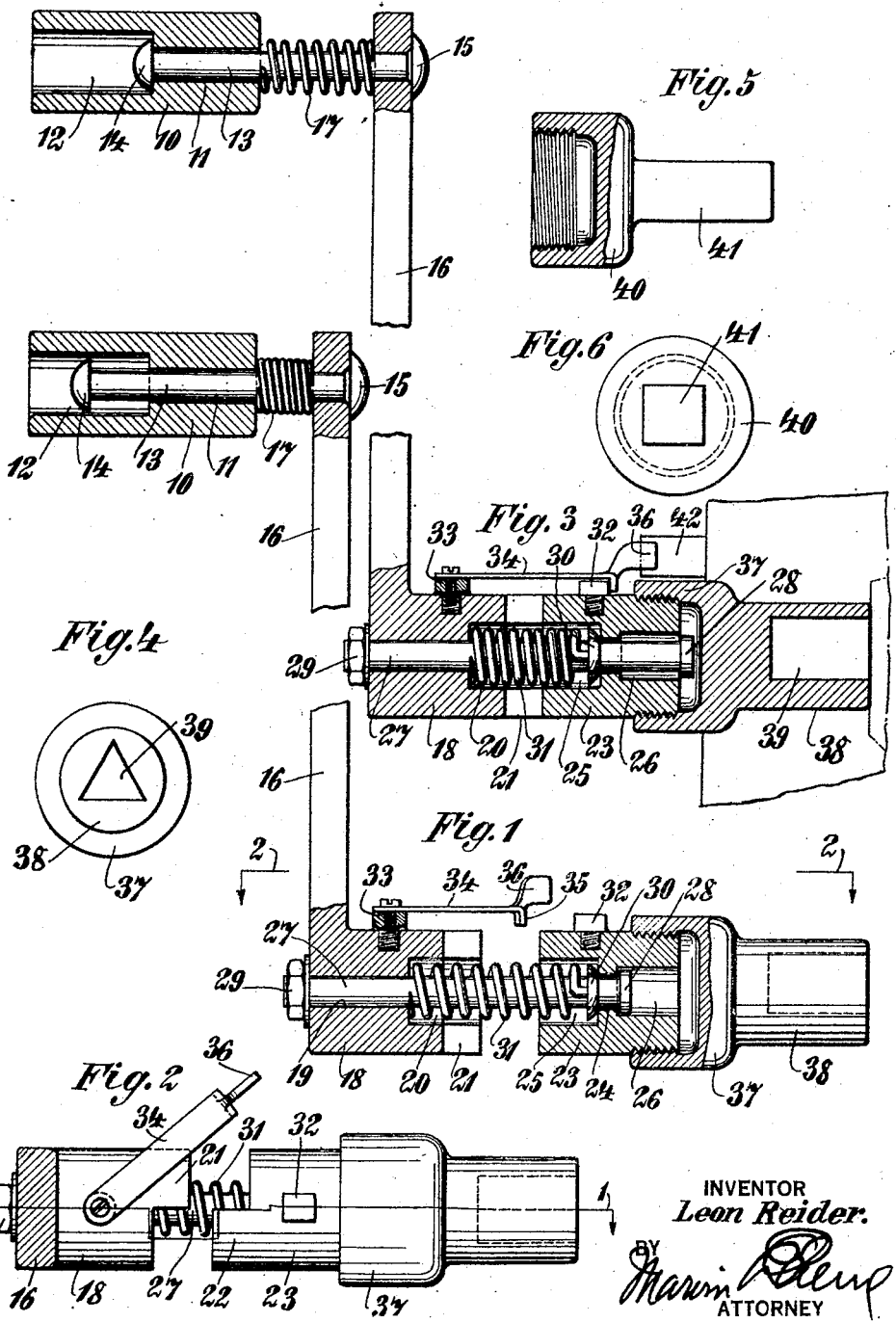

1,579,031

UNITED STATES PATENT OFFICE.

LEON REIDER, OF BROOKLYN, NEW YORK.

AUTOMATIC DISENGAGEABLE CRANK.

Application filed January 26, 1925. Serial No. 4,640.

*To all whom it may concern:*

Be it known that I, LEON REIDER, a citizen of the United States, residing at Brooklyn, in the county of Queens and State of New York, have invented certain new and useful Improvements in Automatic Disengageable Cranks, of which the following is a specification.

This invention relates to improvements in cranks and more particularly to such cranks as are manually used in starting internal combustion motors employed in propelling vehicles.

Such vehicles, as automobiles, boats and the like, driven by engines using gasoline, as an example, require to be started by power outside themselves, usually by a hand actuated crank, which, upon the engine becoming started must be instantly disengaged or serious injury to the operator will occur.

It is the main purpose of the present invention to provide a crank that may be used with entire safety for such operations as its main portion is composed of two sections, latched together, the latch being automatically disengaged and the parts separated, in a fraction of a second, upon the engine acquiring an impulse from the fuel.

A further aim is in the provision of an effective and safely operated hand crank that avoids imparting any shock or unpleasant sensation to the hand grasping the crank handle at the moment of release of the operative elements.

Another feature is to provide a simple safety hand crank that can be manufactured at a moderate cost and which is adapted for long service without deterioration.

These and allied aims and objects which will later appear, are accomplished by the novel construction and combination of parts hereinafter described and shown in the accompanying drawing, forming a material part of this disclosure, and in which:—

Figure 1 is a partial side elevational, partial longitudinal sectional view of an embodiment of the invention, the section being taken substantially on line 1—1 of Figure 2.

Figure 2 is a plan and sectional view looking on line 2—2 of Figure 1.

Figure 3 is a view similar to Figure 1, but showing the parts in a normal, operative position.

Figure 4 is an end view of the device as shown in Figures 1, 2 and 3.

Figure 5 is a partial side and sectional view of another form of adapter.

Figure 6 is an end view thereof.

Referring more in detail to the drawing, the numeral 10 designates a cylindrical handle having a longitudinal bore 11 and an axial counterbore 12 at its outer end.

Loosely contained in the bore is a spindle 13, one of its heads 14 being freely movable in the counterbore 12, the other head 15 being disposed on the inner side of the handle lever-bar 16 in which the spindle is firmly fixed, and interposed between the bar 16 and inner end of the handle 10 is a helically coiled expansion spring 17 encircling the exposed end of the spindle.

The bar 16 has formed at its opposite end a hub 18 containing an axial bore 19 counterbored as at 20 in its inner end which is shaped, by cutting on the center line, to produce a clutch abutment 21 adapted to engage with a similar but opposite clutch extension 22 on a sleeve 23.

The sleeve 23 contains a central bore 24, its outer end being counterbored as at 25 and its opposite end counterbored as at 26.

The sleeve 23 and hub 18 are connected by a spindle 27, passing through the bores 24 and 19, and provided with a head 28 movable in the counterbore 26, the spindle being further provided with a nut 29 on the end extending through the hub 18.

A collar 30 is slidably arranged on the spindle 27 to move within the counterbore 25 of the sleeve and a coiled expansion spring 31 encircles the spindle, extending into the counter-bores 20 and 25 to abut the collar 30, exerting pressure at its ends to cause separation of the hub and sleeve, normally maintaining the clutch elements 21 and 22 out of engagement as shown in Figures 1 and 2.

In order to hold the sleeve 23 in operative engagement with the hub 18, a square headed pin or screw 32 is fixed in the periphery of the sleeve, and a block 33 is secured in a similar manner on the hub 18.

Pivoted to the block 33 is a catch bar 34 having a detent 35 adaped to engage the pin 32 and provided with a trigger or finger hold 36 for convenience in operating and for another purpose further on described.

It will now be seen that when the latch bar 34 is moved into an engaging position, as shown in Figure 3, the clutch elements 21 and 22 will be held in engagement and upon operating the handle 10, the sleeve 23 will be rotated.

A projection 42, extending from some fixed portion of the motor or its housing, makes contact with the trigger 36 at one point in the revolution of the crank causing the pin 32 to disengage the detent, whereupon the spring 31 operates to separate the clutch elements, permitting the sleeve to rotate and the hub to remain quiescent and transmit no motion to the handle 10.

The outer end of the sleeve 23 is engaged by screw threads in an adapter 37 having an outwardly extending shank 38 containing an opening 39 which may be of any cross section area to engage the motor shaft to which it is applied or the adapter may present a socket 40 having an extending stem 41 suited to enter a corresponding opening in the motor shaft, the manner of attaching the adapter being immaterial relative to the invention.

Having thus described my invention, what I claim as new and desire to secure by Letters Patent, is:—

1. A safety crank comprising a lever provided with a handle at one end and a hub at the other, a sleeve, a spindle connecting said sleeve and hub, a spring encircling the spindle to press the sleeve away from the hub, clutch elements carried co-operatively by said hub and sleeve, a latch pivoted to said hub, a pin fixed in said sleeve engageable by said latch whereby said clutch elements are held in operative engagement, means for releasing the latch, and an adapter in engagement with said sleeve.

2. A safety crank comprising a lever provided with a handle at one end and a hub at the other, a sleeve, a spindle connecting said sleeve and hub, a spring encircling the spindle to press the sleeve away from the hub, clutch elements carried co-operatively by said hub and sleeve, a latch pivoted to said hub, a pin fixed in said sleeve engageable by said latch whereby said clutch elements are held in operative engagement, an adapter carried by said sleeve, a spring interposed between said lever and the handle thereon, and means for releasing the latch upon completion of handle movement.

In witness whereof I have affixed my signature.

LEON REIDER.